United States Patent [19]

Smith

[11] Patent Number: 4,613,115

[45] Date of Patent: Sep. 23, 1986

[54] TEMPERATURE COMPENSATED GAS SPRING

[75] Inventor: Richard C. Smith, Pittsburgh, Pa.

[73] Assignee: Gas Spring Company, Division of Fichtel & Sachs Industries, Inc., Colmar, Pa.

[21] Appl. No.: 719,633

[22] Filed: Apr. 4, 1985

Related U.S. Application Data

[63] Continuation of Ser. No. 413,241, Aug. 30, 1982, abandoned.

[51] Int. Cl.[4] ............................................. F16F 9/06
[52] U.S. Cl. ............................ 267/64.25; 267/120; 280/702; 280/708
[58] Field of Search ............... 188/269; 267/64.11, 267/64.25, 113, 120, 121; 280/702, 708; 16/66; 296/56, 76

[56] References Cited

U.S. PATENT DOCUMENTS

| | | | |
|---|---|---|---|
| 2,882,042 | 4/1959 | Fleckenstein | 267/34 |
| 2,944,639 | 7/1960 | Blake | 188/97 |
| 3,107,752 | 10/1963 | McLean | 188/87 |
| 3,188,072 | 6/1965 | Wustenhagen et al. | 267/113 |
| 3,301,410 | 1/1967 | Seay | 213/43 |
| 3,375,001 | 3/1968 | Hennells | 267/64.11 X |
| 3,444,830 | 5/1969 | Doetsch | 108/136 |
| 3,610,605 | 10/1971 | Cornelius | 267/64.25 |
| 3,944,197 | 3/1976 | Dachicourt | 267/64 R |
| 3,971,551 | 7/1976 | Kendall et al. | 267/65 R |
| 3,995,842 | 12/1976 | Freitag | 267/113 X |

FOREIGN PATENT DOCUMENTS

| | | | |
|---|---|---|---|
| 659314 | 4/1938 | Fed. Rep. of Germany . | |
| 54-57077 | 7/1977 | Japan . | |
| 339837 | 12/1930 | United Kingdom | 267/64.11 |
| 657217 | 9/1951 | United Kingdom . | |
| 737144 | 9/1955 | United Kingdom | 267/64.11 |
| 817943 | 8/1959 | United Kingdom | 267/64.19 |
| 1099734 | 1/1968 | United Kingdom . | |

Primary Examiner—George E. A. Halvosa
Attorney, Agent, or Firm—Brumbaugh, Graves, Donohue & Raymond

[57] ABSTRACT

A temperature compensated gas spring having a sealed outer casing and a tube located within the outer casing. A piston is located within the tube and a rod is attached to the piston extending out of the casing through one end thereof. A primary pressure source is located within the casing and the tube and acts against the piston to urge the rod out of the casing. A secondary pressure source is located within the casing and the tube and acts against the piston to urge the rod into the casing. The primary pressure created by the primary pressure source is greater than the secondary pressure created by the secondary pressure source, and the percent change of the secondary pressure with temperature variation is greater than the percent change of the primary pressure with the same temperature variation.

31 Claims, 7 Drawing Figures

TEMPERATURE COMPENSATED GAS SPRING

This application is a continuation of application Ser. No. 413,241, filed on Aug. 30, 1982, now abandoned.

DESCRIPTION

1. Technical Field

This invention relates to gas springs and more particularly to gas springs which are automatically compensating so as to operate uniformly over a broad temperature range.

2. Background Art

The springs used to support automobile trunk lids, hoods, and the like, especially the hatch-back trunk lid, are often of the gas spring variety. A gas spring is essentially a sealed cylinder containing a gas under high pressure and having a piston rod extending from one end of the cylinder. Typically, nitrogen gas having a pressure of approximately 1000 psi is used in the cylinder. The spring force results from the pressure of the gas acting on a cross sectional area equal to that of the rod within the cylinder and urging the rod outwardly. When the rod is pushed into the cylinder, as when the hatch-back trunk lid is closed, the rod displaces a certain volume within the cylinder which was previously occupied by the gas. Since the total volume within the cylinder is fixed, the remaining volume available to the gas decreases, resulting in an increase in the pressure of the gas. Thus, the force acting to move the rod outward increases. In conventional gas springs, a piston-like structure may be attached to the rod inside of the cylinder and used for damping and limiting the extent of motion of the rod. Since the gas pressure is normally equal on both sides of the piston, it produces little if any force on the rod.

Ideally, the pressure of the gas should be sufficient to move the piston rod outwardly from the cylinder and lift the trunk lid or the like which is attached thereto. The gas pressure should also be low enough when the rod is completely extended and the trunk lid or the like is raised to enable a person to easily move the rod into the cylinder when the trunk lid is being closed. A drawback arising from the use of a single gas in a gas spring is that the pressure of any gas in a fixed volume is related to the temperature of the gas. For an ideal gas, which nitrogen resembles, the pressure is directly proportional to the absolute temperature of the gas. This dependence can cause considerable problems when such gas springs are used in automobiles that are exposed to ambient temperatures ranging from below 0° F. to above 100° F.

When the ambient temperature is low the pressure of the gas inside the cylinder is low, resulting in insufficient force to urge the rod outwardly to lift the weight of the trunk lid. When the ambient temperature is high the pressure of the gas inside the cylinder is high, resulting in a large force urging the rod out of the cylinder, a situation which may cause a trunk lid connected to the rod to raise very quickly and strike a person opening the trunk. Furthermore, when the ambient temperature is high, the gas pressure inside the cylinder is large when the rod is completely extended, making it difficult to move the rod into the cylinder when it is desired to close the trunk lid.

Shock absorbers which automatically compensate for changes in ambient temperature are known in the art. See, for example, U.S. Pat. No. 2,944,639 to Blake, U.S. Pat. No. 3,107,752 to McCean, U.S. Pat. No. 3,301,410 to Seay, U.S. Pat. No. 3,971,551 to Kendall et al., and U.S. Pat. No. 3,944,197 to Dachicourt. These devices generally provide an extra chamber or the like within the shock absorber to accommodate the changing volume of the primary damping fluid as the ambient temperature changes. Such devices are not appropriate for providing temperature compensation in a gas spring because they are concerned with keeping the fluid volume constant, rather than with keeping an outwardly directed pressure constant.

It is an object of the present invention to provide a gas spring in which the sensitivity of its spring force to temperature variation is reduced to an acceptably low level.

DISCLOSURE OF THE INVENTION

The invention is a temperature compensated gas spring which includes a sealed casing, a slidable rod extending from the interior to the exterior of the casing through one end thereof, and a piston mounted to the rod within the casing. A primary pressure source is located within the casing and acts against the piston to urge the rod out of the casing, and a secondary pressure source is located within the casing and acts against the piston to urge the rod into the casing. The primary pressure is greater than the secondary pressure, and the percent change of the secondary pressure with temperature is greater than the percent change of the primary pressure with temperature.

The primary pressure source is preferably a pressurized primary gas, such as nitrogen gas, whose pressure varies essentially proportionally with absolute temperature and which remains in the gas phase over the temperature range to which the gas spring is exposed. A desirable temperature range is −30° C. to 80° C.

The secondary pressure source is preferably the vapor pressure of a two-phase system in which the liquid and vapor phases are in equilibrium over the temperature range of −30° C. to 80° C. Such vapor pressure varies approximately exponentially with absolute temperature. Suitable two-phase systems include acetylene, ethane, FREON-12, FREON-13, FREON-114, propane, propadiene, perfluoropropane, dimethyl ether, N-butane, ammonia, hydrogen bromide, and hydrogen iodide. The secondary pressure source may also be a two-phase system in which the liquid and vapor phases remain in equilibrium over a substantial portion of the temperature range of −30° C. to 80° C., such as sulfur hexafluoride.

In the preferred embodiment of the invention the sealed casing includes a cylindrical tube with a closed end wall at one end and an end wall having an opening to allow the rod to pass therethrough at the other end. An inner tube is coaxially disposed within the casing, and one end of the inner tube is attached to the closed end wall. The piston is disposed within the inner tube and divides the inner tube into a first inner volume between the piston and the closed end wall and a second inner volume in the remainder of the inner tube. A baffle is located between the inner and outer tubes to divide the casing volume, exterior of the inner tube, into a first outer volume adjacent the closed end wall and a second outer volume adjacent the end wall with the opening. A first conduit means permits fluid flow between the first inner volume and first outer volume, and a second conduit means permits fluid flow between the second inner volume and second outer volume. The primary pressure source is located in the first inner volume and first outer volume and the secondary pressure source is located in the second inner volume and second outer volume.

The first conduit means is preferably one or more holes through the inner tube beyond the extent of travel of the piston toward the closed end wall. In one embodiment the inner tube is shorter than the cylindrical tube, and the inner tube is in fluid flow communication with the second outer volume to form the second conduit means. In a second embodiment, the inner tube is the same length as the cylindrical tube, and both ends are attached to the end walls of the casing, and the second conduit means is one or more holes through the inner tube beyond the extent of travel of the piston toward the end wall with the opening.

The gas spring may also include a stop which limits the travel of the piston. A fluid seal is provided between the piston and the inner tube and between the rod and the wall through which it passes.

DESCRIPTION OF THE PREFERRED EMBODIMENTS

Figure 1:
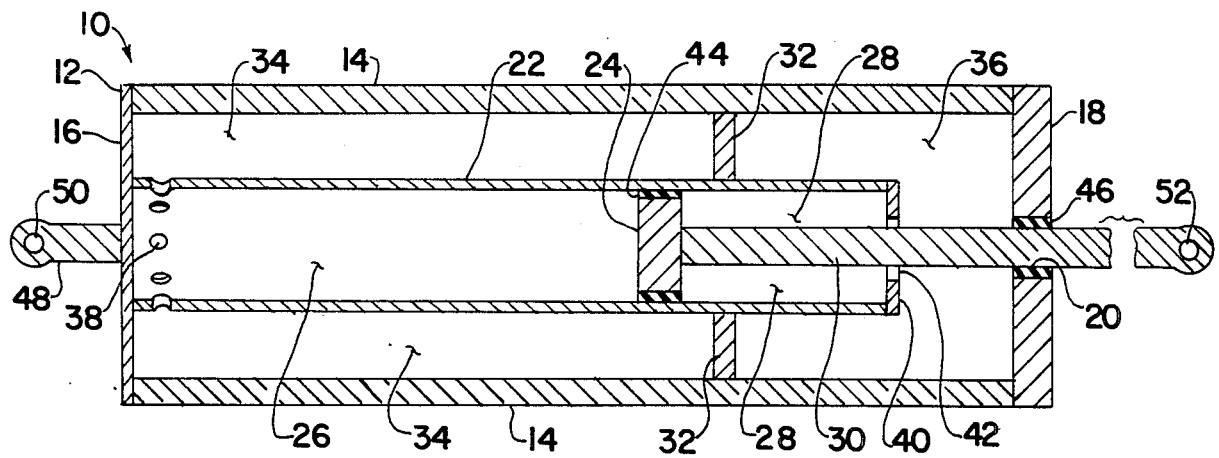
FIG. 1 is an axial, sectional view of a first embodiment of a gas spring in accordance with the present invention.

One embodiment of a temperature compensated gas spring in accordance with the present invention is shown in FIG. 1. The gas spring 10 includes a sealed casing 12 made of an outer sleeve or tube 14 with a closed end wall 16 mounted at one end and with a wall 18 mounted at the other end. Wall 18 has an opening 20 therethrough. The gas spring 10 includes an inner sleeve or tube 22 located inside of and coaxial with casing 12. One end of inner tube 22 is attached to end wall 16, and the other end is axially spaced from wall 18. A piston 24 is located within inner tube 22 and divides the interior of inner tube 22 into a first inner volume 26 between closed end wall 16 and piston 24 and a second inner volume 28 on the side of the piston toward wall 18. An elongated rod 30 is attached to piston 24 and extends out of casing 12 through opening 20 in wall 18.

A baffle 32 is attached to and extends between the outside of inner tube 22 and the inside of outer tube 14 and divides the casing volume, exclusive of the inner tube, into a first outer volume 34 adjacent wall 16 and a second outer volume 36 adjacent the wall 18. The baffle is preferably an annular plate. The baffle 32 also provides support to inner tube 22. One or more holes 38 are provided in inner tube 22 at a location beyond the extent of travel of piston 24 therein in the direction toward end wall 16. Holes 38 form a first conduit means which permits fluid flow between first inner volume 26 and first outer volume 34. In the embodiment shown in FIG. 1, inner tube 22 is open at the end closest to wall 18 and forms a second conduit means which permits fluid flow between second inner volume 28 and second outer volume 36.

The gas spring 10 may include a stop 40 at the free end of inner tube 22 which limits the travel of piston 24 toward the wall 18 and retains the piston within inner tube 22. Stop 40 shown in FIG. 1 is a washer-like plate attached to the end of inner tube 22 which surrounds, but does not contact, rod 30 to leave an annular space 42 between rod 30 and stop 40 for fluid flow. The gas spring 10 includes a first seal 44 between piston 24 and the inner surface of inner tube 22 to prevent fluid flow between the first and second inner volumes 26, 28 and includes a second seal 46 between rod 30 and wall 18 to prevent fluid flow between the interior and exterior of casing 12.

The gas spring 10 also includes a rod 48 attached to the exterior of closed end 16 of casing 12 having an eye 50 at its end. Rod 30 has an eye 52 at its free end exterior of casing 12. Eyes 50 and 52 allow gas spring 10 to be mechanically connected between two points, such as between the body and the trunk lid of an automobile. Preferably inner tube 22, outer tube 14 and piston 24 are cylindrical in shape.

A primary pressure source is located in first inner volume 26 and first outer volume 34 and acts against piston 24 to urge rod 30 outwardly of casing 12. A secondary pressure source is located in second inner volume 28 and second outer volume 36 and acts against piston 24 to urge the rod into the casing. The net force acting on piston 24 results from the difference between the forces from the primary and secondary pressure sources. Since gas spring 10 is to function as a spring with an outwardly directed spring force, it is necessary that the primary pressure be greater than the secondary pressure.

Preferably, the primary pressure source will be a pressurized primary gas whose pressure varies proportionally with absolute temperature and which will remain gaseous over the temperature range to which the gas spring is exposed. A preferred primary gas is nitrogen gas which behaves essentially according to the ideal gas law ($PV=nRT$) over the temperature range of $-30°$ C. to $80°$ C. It will be recognized in the art that no gas will perform exactly in accordance with the theoretical ideal gas law. Other gases which may be used include argon, helium, hydrogen, krypton, and neon.

The reduction of temperature sensitivity in gas spring 10 is accomplished by providing a reverse force on piston 24 from the secondary pressure source which tends to cancel out the extra force from the primary pressure source due to increases in temperature. The secondary pressure is chosen to behave quite differently from the essentially perfect gas behavior of the primary gas. In one aspect of the invention, the secondary pressure source is the vapor pressure of a two-phase system in which the liquid and vapor phases are in equilibrium. The vapor pressure of such a two-phase system varies approximately exponentially with absolute temperature rather than directly proportionally. The main requirement of any secondary pressure source selected is that the percent change of secondary pressure with temperature be greater than the percent change of the primary pressure with temperature.

There are many organic and inorganic substances that can serve as a secondary pressure source, including acetylene, ethane, FREON-12, FREON-13, FREON-114, propane, propadiene, perfluoropropane, dimethyl ether, N-butane, ammonia, hydrogen bromide, and hydrogen iodide. The vapor pressure of these substances range from about 0 to 150 pounds per square inch (psi) at a temperature of about $-30°$ C. to about 100 psi to over 900 psi at 70° C. In a two-phase system, for a given substance the pressure exerted by its vapor will depend only on temperature. The best substance to use in a given application is determined by design requirements for the application, such as spring force, spring size, material cost, manufacturing cost, seal lifetime, and degree of temperature compensation desired.

It is not absolutely necessary that the secondary pressure be generated by a two-phase system. As described in detail hereinafter in connection with Example 3, sulfur hexafluoride can be used as the secondary pressure source. Above a critical temperature, sulfur hexafluoride cannot exist as a two-phase system, but exists solely as a vapor with no liquid phase present. However, temperature compensation is achieved even above the critical temperature because the percent change of the sulfur hexafluoride vapor pressure (i.e., the secondary pressure) with temperature will still be greater than the percent change of a perfect gas pressure with temperature.

Since a substance will remain in a two-phase system with its vapor and liquid phases in equilibrium only for certain ranges of specific volume, a requirement is placed on the volume available for the substance in the gas spring. In general it is desired that both the liquid and vapor phases always be present so that the vapor pressure will depend only on temperature. As the spring is compressed, i.e., as the piston 24 is moved toward wall 16, the volume available for the two-phase system is increased. If initially there is an insufficient amount of the liquid phase of the substance, such an increase of the total available volume could cause all of the liquid to convert to vapor. The pressure of this vapor will in general vary with the temperature in a fashion similar to other gases and thus provide little if any temperature compensation. However, if too much of the substance is used, a problem arises when the spring is allowed to expand, thus reducing the volume available for the substance. This reduction in volume could cause all of the vapor phase to condense, forcing the substance entirely into the liquid phase. This would effectively prevent the piston from moving any further.

To avoid these possible problems with a two-phase system used as a secondary pressure source, the following requirements must be met: (1) The minimum amount of the substance necessary is that which is just sufficient to provide a two-phase system when the gas spring is fully compressed i.e., when the available volume is the greatest, at the highest temperature to which the gas spring may be exposed, and (2) The volume available for the substance should be sufficiently large so that the vapor does not entirely condense into liquid when the gas spring is fully extended i.e., when the available volume is the smallest. The limiting environment for this second requirement is also the highest temperature to which the gas spring may be exposed.

The concentric tube arrangement shown in FIG. 1 is particularly advantageous in a gas spring. A sufficient additional volume exterior of inner tube 22 is provided in first outer volume 34 for the primary gas so that it is not excessively compressed when rod 30 is completely retracted within the gas spring. Otherwise, the resulting excessive pressures could cause undesirable and excessive spring forces. Likewise, an additional volume exterior of inner tube 22 is provided in second outer volume 36 for the secondary pressure source so that it is not excessively compressed when rod 30 is completely extended.

All of the components of gas spring 10, with the exception of seals 44 and 46 are made of a metal with sufficient strength to withstand the pressures of the confined gases. The use of a cylindrical inner tube 22, outer tube 14, and piston 24 is particularly advantageous.

EXAMPLE 1

The following is an example of a gas spring 10 in accordance with the embodiment shown in FIG. 1 using nitrogen gas as the primary pressure source and using ammonia as the two-phase system for the secondary pressure source. The relationship between the various parameters involved in gas spring 10 can be described algebraically using the following variables:

Ag = area of the piston on which the nitrogen gas pressure acts (in.$^2$)

Av = area of the piston on which the ammonia vapor pressure acts (in.$^2$)

Dp = diameter of the piston (in.)

Dr = diameter of the rod (in.)

F = force of the gas spring (lb.)

Pg = pressure of the nitrogen gas (psi)

Pv = pressure of the ammonia vapor (psi)

Po = nitrogen gas pressure at 20° C. (psi)

T = temperature (°C.)

The net outward spring force, F, is determined by subtracting the force acting on the piston due to the ammonia vapor from the force acting on the piston due to the nitrogen gas. The equation for calculating F, ignoring the force of atmospheric pressure on the rod 30, is:

$$F = A_g P_g - A_v P_v \qquad (1)$$

The pressure of the nitrogen gas is reasonably well represented by:

$$P_g = \frac{(T + 273) P_o}{293} \qquad (2)$$

For this example it is assumed that the desired spring force F is 100 lb. at the temperature extremes of $-30°$ C. and 70° C. The vapor pressure of ammonia in a two-phase system can be determined from standard and well known handbooks such as *Chemical Engineers Handbook*, edited by John H. Perry (McGraw-Hill, 1950, 3d Edition). At $-30°$ C. the vapor pressure of ammonia is 20 psi, and at 70° C. the vapor pressure is 475 psi. By inserting these values, the desired F = 100 lb., and equation 2 into equation 1, the following equations are obtained:

$$100 = \frac{Ag(-30 + 273)Po}{293} - 20 Av \quad (3)$$

$$100 = \frac{Ag(70 + 273)Po}{293} - 475 Av \quad (4)$$

Solving equations 3 and 4 simultaneously yields:

$$Av = 0.0921 \text{ in.}^2 \quad (5)$$

$$AgPo = 122.80 \text{ lb.} \quad (6)$$

If the rod diameter, Dr, is chosen to be 5/16", a value typical for gas springs, the area of the piston, Av, on which the ammonia vapor pressure acts, is:

$$Av = \pi/4(Dg^2 - Dr^2) = \pi/4(Dg^2 - (5/16)^2) = 0.0921 \text{ in.}^2 \quad (7)$$

The solution of equation 7 results in Dg=0.4636 in., from which it is determined that Ag=0.1688 in.². Using equation 6 above, the necessary fill pressure, Po, for the nitrogen gas at 20° C. is 727 psi.

By loading the first inner volume and first outer volumes with nitrogen gas at 727 psi at 20° C., selecting the rod diameter to be 5/16" and the piston diameter to be 0.4636 in., and loading the second inner volume and second outer volume with an amount of ammonia such that the liquid and vapor phases will remain in equilibrium, the gas spring will have a nominal outward force of 100 lb. at the temperature extremes of −30° C. and 70° C. The behavior of this gas spring at other temperatures can be determined by calculating Pg at other temperatures using equation 2 above, determining the values of Pv at various temperatures, and calculating the forces using equation 1 above. Table I below lists this data over the desired temperature range.

TABLE I

| Temp. [C.] | Pressure | | Spring Force | | |
|---|---|---|---|---|---|
| | Pg [psi] | Pv [psi] | PgAg [lb] | PvAv [lb] | F [lb] |
| −30 | 603.9 | 20 | 101.8 | 1.8 | 100.0 |
| −20 | 627.8 | 30 | 106.0 | 2.8 | 103.2 |
| −10 | 652.6 | 45 | 110.2 | 4.1 | 106.1 |
| 0 | 677.4 | 65 | 114.4 | 6.0 | 108.4 |
| 10 | 702.2 | 90 | 118.6 | 8.3 | 110.3 |
| 20 | 727.0 | 125 | 122.8 | 11.5 | 111.3 |
| 30 | 751.8 | 170 | 127.0 | 15.7 | 111.3 |
| 40 | 776.6 | 230 | 131.2 | 21.2 | 110.0 |
| 50 | 801.4 | 294 | 135.4 | 27.1 | 108.3 |
| 60 | 826.2 | 370 | 139.6 | 34.1 | 105.5 |
| 70 | 851.1 | 475 | 143.7 | 43.7 | 100.0 |

Figure 2:
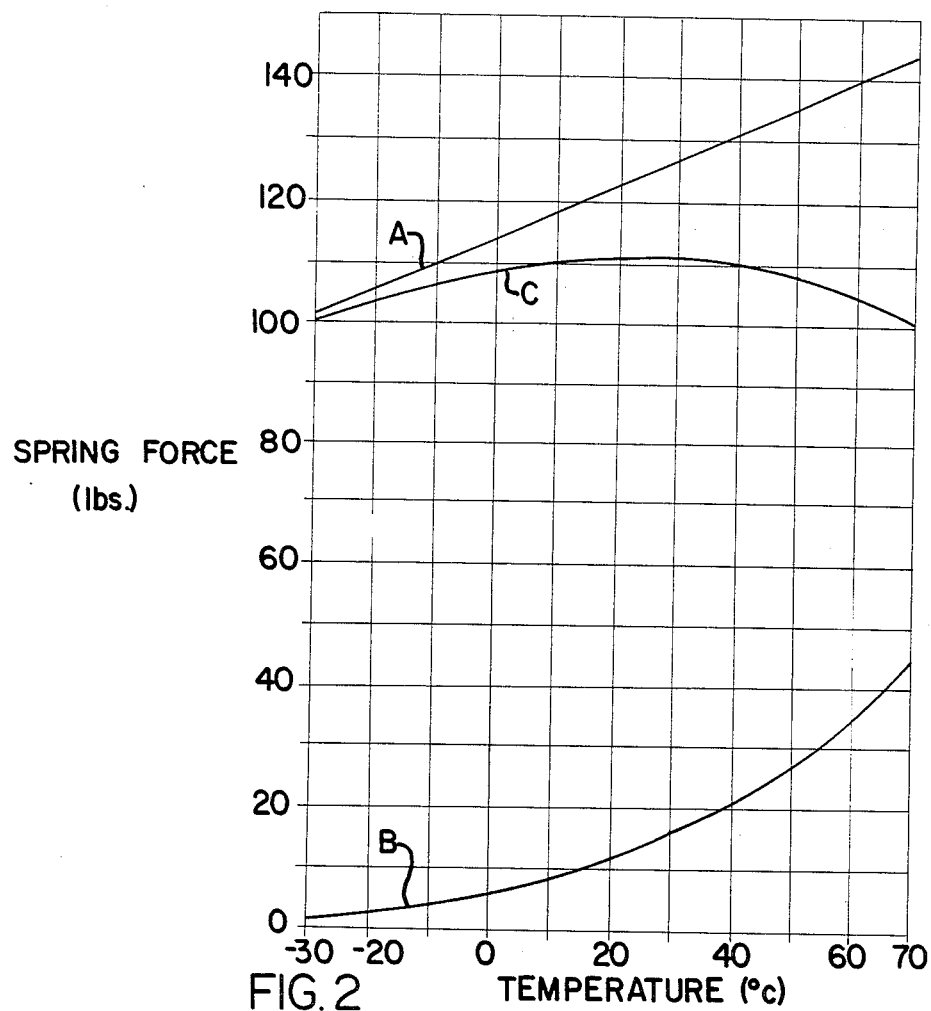
FIG. 2 is a graph showing force as a function of temperature of the gas spring shown in FIG. 1 wherein the primary pressure source is nitrogen gas and the secondary pressure source is ammonia liquid and vapor in equilibrium.

The above results are shown graphically in FIG. 2 where curve "A" represents the outward force acting on the piston (PgAg), curve "B" represents the inward force acting on the piston (PvAv), and curve "C" represents the net spring force of the gas spring of Example 1, all as a function of temperature. This gas spring has a maximum force of about 111.3 lb. between 20° and 30° C., and a minimum force of 100 lb. at the temperature extremes. The temperature compensation of the gas spring of Example 1 can be compared with the use of nitrogen gas alone by comparing the maximum and minimum spring forces developed with the force at 20° C. being the standard. The deviation is about 10% for the gas spring of Example 1 while the deviation is about 34% for a gas spring using nitrogen gas alone. It can be appreciated that the gas spring of the present invention considerably reduces the variation of spring force with temperature as compared with the use of nitrogen gas alone.

Figure 3:
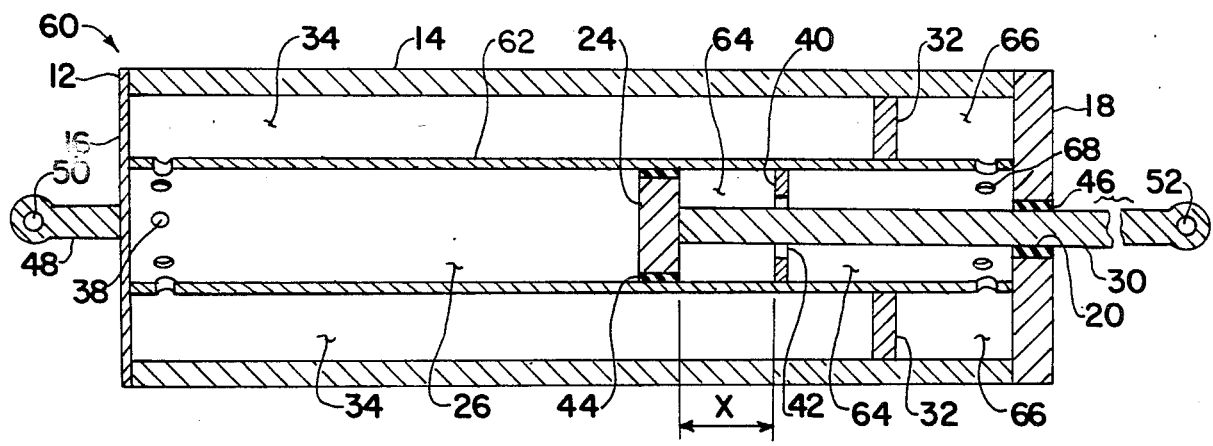
FIG. 3 is an axial, sectional view of a second embodiment of a gas spring in accordance with the present invention.

A second embodiment of a temperature compensated gas spring in accordance with the present invention is shown in FIG. 3. The gas spring 60 shown in FIG. 3 has many elements which are identical with elements in the gas spring 10 shown in FIG. 1 and discussed above. Accordingly, like elements in both figures are referred to by like reference numbers, and only the differences between the two embodiments will be discussed.

In the gas spring 60 shown in FIG. 3, the inner tube 62 extends completely between end walls 16 and 18 and is attached to both end walls. The second inner volume 64 is located within inner tube 62 between piston 24 and wall 18, and second outer volume 66 is located exterior of the inner tube between baffle 32 and wall 18. One or more holes 68 are located in inner tube 62 at a location beyond the extent of travel of piston 24 toward wall 18, as determined by stop 40. Holes 68 form a conduit means between second inner volume 64 and second outer volume 66.

Other than the above mentioned structural differences, the embodiment of the gas spring 60 shown in FIG. 3 operates exactly the same as the gas spring 10 shown in FIG. 1. A primary pressure source is located in the first inner volume 26 and first outer volume 34, and a secondary pressure source is located in second inner volume 64 and second outer volume 66, as described above in connection with FIG. 1.

The relationship between the various parameters involved in gas spring 60 can be described algebraically using the following variables:

Ag=area of the piston on which the primary gas pressure acts (in.²)

Ar=area of the rod on which atmospheric pressure acts (in.²)

Av=area of the piston on which the secondary pressure acts (in.²)

Dp=diameter of the piston (in.)

Dr=diameter of the rod (in.)

Dt=inner diameter of the outer tube (in.)

F=net outward force of the gas spring (lb.)

L=length of the inner and outer tubes (in.)

Ls=distance between stop 40 and the wall 18 (in.)

Lt=length of gas spring between eye 50 and eye 52, which varies with X (in.)

Lv=distance between baffle 32 and the wall 18 (in.)

M=mass of the secondary pressure source material (lb.)

Pa=atmospheric pressure (psi)

Pg=pressure of the primary gas (psi)

Po=pressure of the primary gas at 20° C. (psi)

Pv=pressure of the secondary pressure source (psi)

S=stroke, or maximum design value for the spring compression X (in.)

T=temperature (°C.)

Vg=volume of the primary gas which varies with X (in.³)

Vv=volume of the secondary pressure source material, also varying with X (in.³)

Wc=thickness of the inner tube (in.)

Wp=thickness of the piston (in.)

Ws=thickness of the baffle (in.)

X=amount of spring compression, measured from the stop to the piston (in.)

The characteristics of the preferred embodiment, shown in FIG. 3, can be described by selecting initial values for the following parameters: Dp, Dr, Dt, L, Ls, Lv, Lt (maximum), Pa, Po, S, Wc, Wp, and Ws. It is also necessary to know the dependence of both Pg and Pv on temperature. For Pg it is usually sufficient to use the perfect gas law. For Pv, the dependence of vapor pressure on temperature for the particular substance selected can be obtained from well known handbooks.

The following equations relate to the remaining parameters to the initial ones listed above.

$$Ag = \frac{\pi Dp^2}{4} \quad (8)$$

$$Ar = \frac{\pi Dr^2}{4} \quad (9)$$

$$Lt(\text{minimum}) = Lt(\text{maximum}) - S \quad (10)$$

$$Lt = Lt(\text{maximum}) - X \quad (11)$$

$$Av = Ag - Ar \quad (12)$$

$$Vg = \pi/4(Dt^2 - (Dp+2Wc)^2)(L-Lv-Ws) + Ag(L-Wp-Ls-X) \quad (13)$$

$$Vv = \pi/4(Dt^2 - (Dp+2Wc)^2)Lv + Av(X+Ls) \quad (14)$$

The pressure of the primary gas is a function of X, through the volume Vg, of the temperature T, and of the fill pressure Po. Under the assumption that gas filling is done with the rod extended (i.e., X=O), and that the gas essentially obeys the ideal gas law, its pressure is given by:

$$Pg = \frac{Po(T + 273) Vg(\text{maxiumum})}{293 Vg} \quad (15)$$

The equation for the spring force as a function of compression and temperature is given by:

$$F = PgAg - PvAv - PaAr \quad (16)$$

EXAMPLE 2

In this example, a gas spring in accordance with the second embodiment using a two-phase secondary pressure source is chosen to have an extended length of 50 inches and a stroke of 20 inches. At a temperature of 20° C. it will have a net spring force F of 150 lb. when extended and 160 lb. when compressed. The primary gas is nitrogen and the secondary pressure source substance is FREON-12 which is maintained such that there is always both the vapor and the liquid phases over the operating temperature range. The temperature compensation is to extend from −30° C. to 80° C.

The values of the initially selected parameters are:
Dp=0.593 in.
Dr=0.3125 in.
Dt=2.25 in.
L=26.0 in.
Ls=3.214 in.
Lv=0.179 in.
Lt(max)=50.0 in.
M=0.0400 lb.
Pa=14.7 psi
Po=604.4 psi
S=20.0 in.
Wc=0.0625 in.
Wp=0.25 in.
Ws=0.0625 in.

Equations 8, 9, and 12 above, then yield the values: Ag=0.277 in.$^2$, Ar=0.077 in.$^2$, and Av=0.200 in.$^2$.

Figure 4:
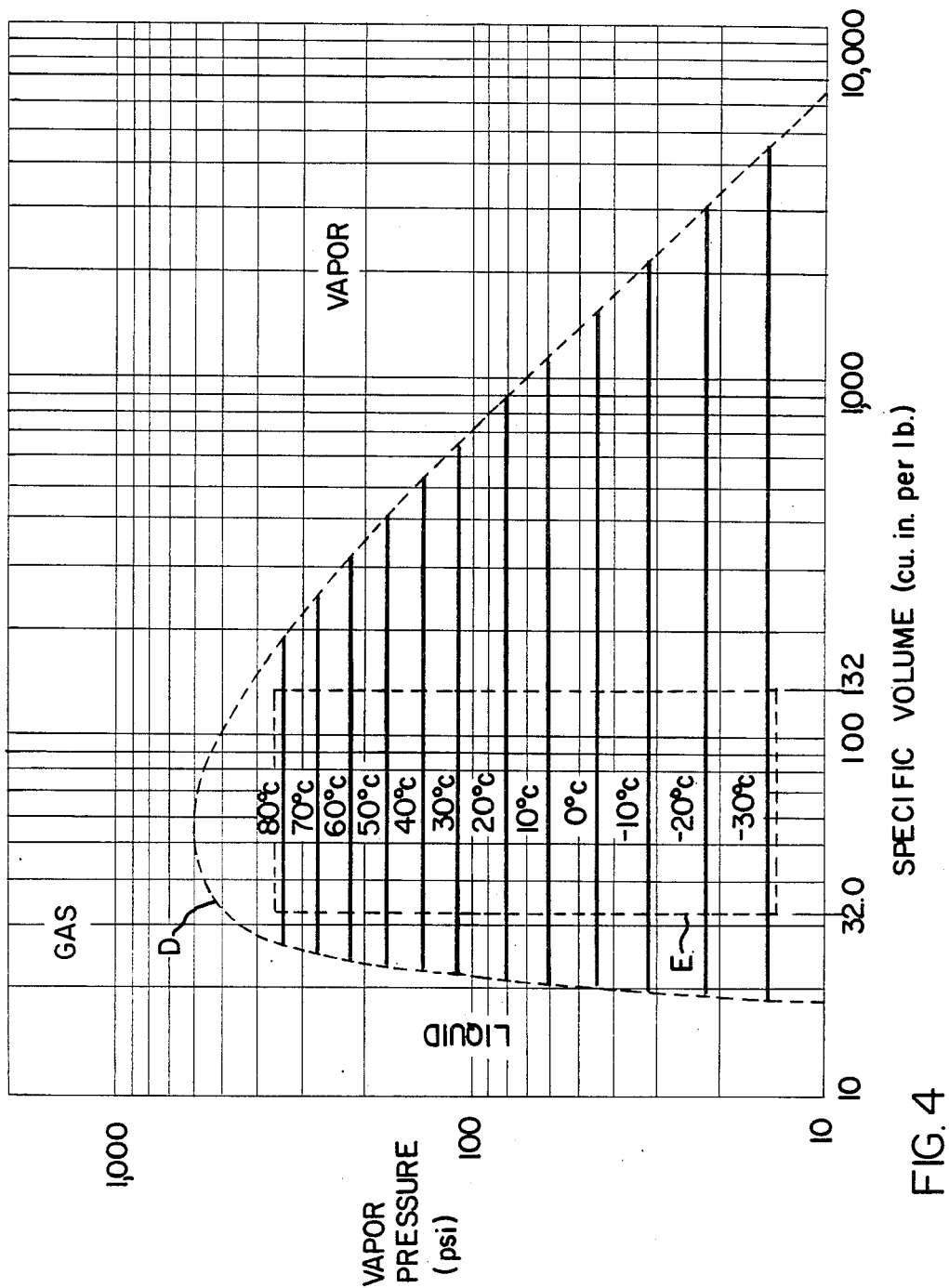
FIG. 4 is a log-log graph showing the phase diagram for FREON-12.

The amount of FREON-12 to be inserted in gas spring 60 in this example is 0.0400 lb. An amount less than about 0.029 lb. would cause all of the liquid to convert to vapor when the spring is fully compressed if the temperature was as high as 80° C. An amount more than about 0.0500 lb. would prevent the spring from extending fully if the temperature was as high as 80° C. because all of the vapor would be compressed into the liquid state. FIG. 4 is a phase diagram of FREON-12, where vapor pressure is plotted as a function of specific volume. There are twelve curves representing the temperatures over which the spring is to be able to function. The dotted line curve "D" shows the region inside of which the liquid and vapor are in equilibrium together, and accordingly, where this example is supposed to operate. Table II below lists the quantities used to compute the specific volume of the FREON-12 in the limiting cases where the gas spring is fully extended and fully compressed.

TABLE II

|  | Gas Spring Fully Extended | Gas Spring Fully Compressed |
|---|---|---|
| Volume Vv [Eq. (14)] | 1.28 cu. in. | 5.28 cu. in. |
| Mass M of FREON-12 | 0.0400 lb. | 0.0400 lb. |
| Specific Volume = Vv/Mass | 32.0 cu. in. per lb. | 132 cu. in. per lb. |

The operating region corresponding to 0.0400 lb. of FREON-12 is shown by the dotted line curve "E" in FIG. 4. For the temperature range of interest the FREON-12 remains clearly within the liquid-vapor phase.

Table III below presents the gas spring force over the full range of spring compression and temperature for which it was designed. The force values come from equation 16 above, together with equation 15, and the FREON-12 vapor pressure values are from the phase diagram of FIG. 4.

TABLE III

| Gas Spring Length Lt [in.] | Compression X [in.] | Spring Force at Various Temperatures [°C.] | | | | | | | | | | | |
|---|---|---|---|---|---|---|---|---|---|---|---|---|---|
| | | −30 | −20 | −10 | 0 | 10 | 20 | 30 | 40 | 50 | 60 | 70 | 80 |
| 50 | 0.00 | 135 | 139 | 143 | 146 | 148 | 150 | 151 | 150 | 148 | 145 | 141 | 133 |
| 46 | 4.00 | 136 | 141 | 144 | 148 | 150 | 152 | 153 | 152 | 150 | 147 | 143 | 136 |
| 42 | 8.00 | 138 | 142 | 146 | 149 | 152 | 154 | 155 | 154 | 153 | 149 | 145 | 138 |
| 38 | 12.00 | 140 | 144 | 148 | 151 | 154 | 156 | 157 | 156 | 155 | 152 | 148 | 140 |
| 34 | 16.00 | 141 | 146 | 150 | 153 | 156 | 158 | 159 | 159 | 157 | 154 | 150 | 143 |
| 30 | 20.00 | 143 | 148 | 152 | 155 | 158 | 160 | 161 | 161 | 159 | 156 | 152 | 145 |

Figures 5, 6:
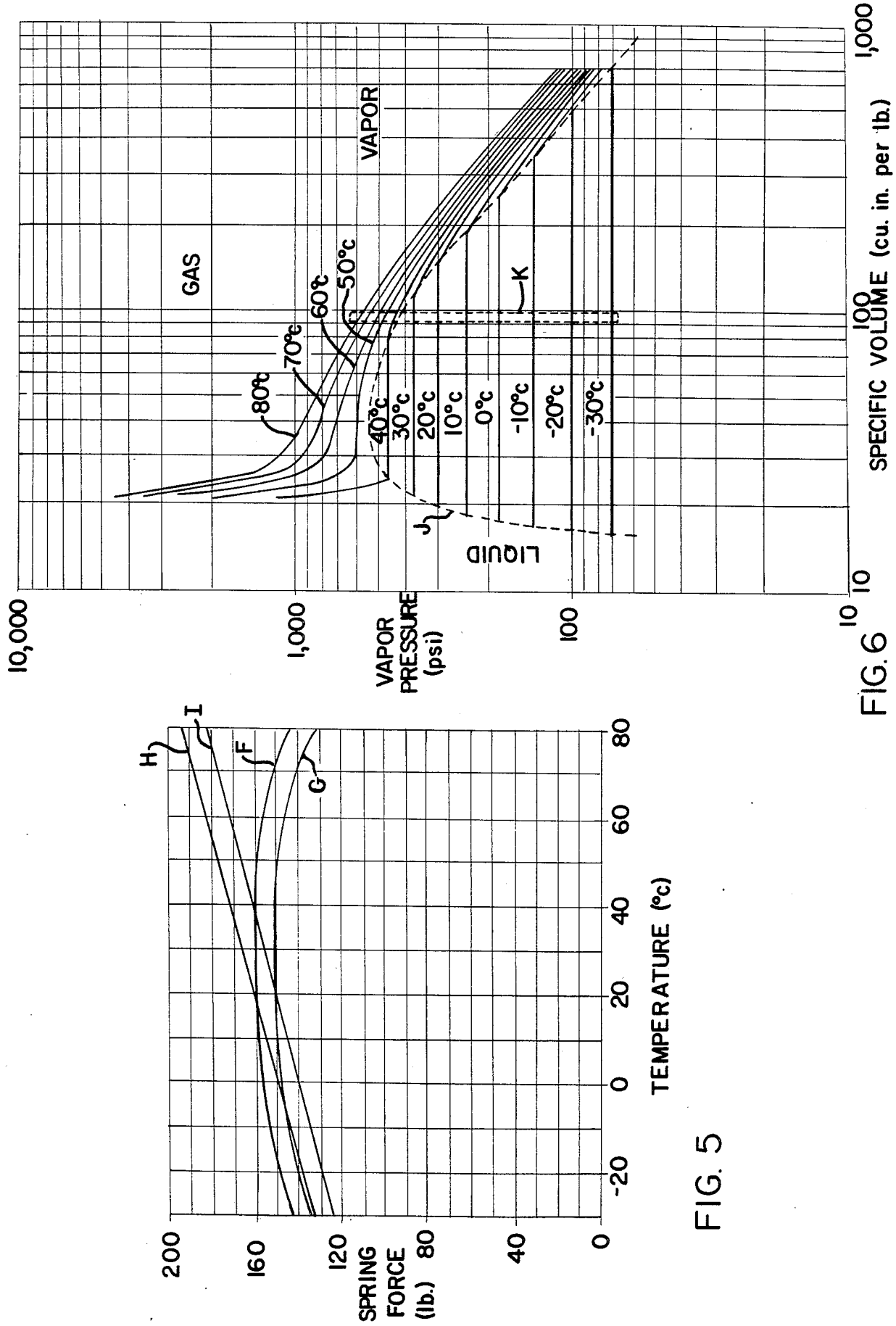
FIG. 5 is a graph of net outward spring force versus temperature of the gas spring shown in FIG. 3 wherein the primary pressure source is nitrogen gas and the secondary pressure source is FREON-12.
FIG. 6 is a log-log graph showing the phase diagram for sulfur hexafluoride.

FIG. 5 is a plot of the results of Table III for full compression and full extension and compares the results with a gas spring that had no temperature compensation. Curve "F" represents the spring force versus temperature for the temperature compensated gas spring of Example 2 when the spring is completely compressed.

Curve "G" shows the same data when the spring is completely extended. Curves "H" and "I" show the spring force versus temperature for an uncompensated gas spring which is completely compressed and completely extended, respectively.

Both FIG. 5 and Table III show that there is compensation for changes in temperature. The degree of temperature compensation can be quantified by computing the resulting percent variation of the spring force with temperature using the data from Table III and comparing it with that expected for an uncompensated design. Table IV gives the temperature-compensated results. On a full swing basis, the deviation due to temperature for gas spring 60 in Example 2 is under 12 percent.

M = 0.464 lb.
Pa = 14.7 psi
Po = 929.5 psi
S = 20.0 in.
Wc = 0.0625 in.
Wp = 0.25 in.
Ws = 0.0625 in.

Equations 8, 9, and 12 above yield the following values: $Ag = 0.204$ in.$^2$, $Ar = 0.077$ in.$^2$, and $Av = 0.128$ in.$^2$.

FIG. 6 is a phase diagram of sulfur hexafluoride, where vapor pressure is plotted as a function of specific volume. There are twelve solid curves representating the temperatures over which the gas spring is to func-

TABLE IV

| | | Percent Variation in Spring Force Due to Temperature | | | |
|---|---|---|---|---|---|
| Gas Spring Length Lt [in.] | Compression X [in.] | Design Force [lb.] @ T = 20° C. F (X, 20) | Minimum Force Fmin [lb]. | Maximum Force Fmax [lb.] | Percent Variation = $\frac{Fmax - Fmin}{F(X, 20)} \times 100$ |
| 50 | 0.00 | 150 | 133 | 151 | 12% |
| 46 | 4.00 | 152 | 136 | 153 | 11% |
| 42 | 8.00 | 154 | 138 | 155 | 11% |
| 38 | 12.00 | 156 | 140 | 157 | 11% |
| 34 | 16.00 | 158 | 141 | 159 | 11% |
| 30 | 20.00 | 160 | 143 | 161 | 11% |

The corresponding variation for an uncompensated gas spring is much larger, namely about 37.5%. It can be estimated by assuming that the gas behaves like a perfect gas. Accordingly, for a given volume Vg, the pressure, and thus the spring force, is proportional to the absolute temperature. For comparison to the above example, a temperature swing of −30° C. to 80° C. (243° K. to 353° K.) would cause the following variation:

$$\frac{F(80° C.) - F(-30° C.)}{F(20° C.)} \times 100 =$$

$$\frac{P(80° C.) - P(-30° C.)}{P(20° C.)} \times 100 =$$

$$\frac{P(353° K.) - P(243° K.)}{P(293° K.)} \times 100 =$$

$$\frac{353° K. - 243° K.}{293° K.} \times 100 = 37.5\%$$

EXAMPLE 3

In this example, as in Example 2, the gas spring is to have an extended length of 50 inches and a stroke of 20 inches. At a temperature of 20° C. it will have a net spring force of 150 lb. in the extended position, and 160 lb. in the compressed position. The primary gas is nitrogen, and the secondary pressure source material is sulfur hexafluoride ($SF_6$). The temperature compensation range is −30° C. to 80° C. despite the fact that the critical temperature for $SF_6$ is 45.55° C., above which it can only exist as a gas.

The values of the initially selected parameters are:
Dp = 0.510 in.
Dr = 0.3125 in.
Dt = 2.50 in.
L = 26.0 in.
Ls = 3.00 in.
Lv = 9.166 in.
Lt(Max) = 50.0 in.

tion. The dotted line curve "J" shows the region inside of which the liquid and vapor are in equilibrium. For this example, 0.4644 lb. of sulfur hexafluoride is to be inserted into the gas spring. Table V below lists the quantities used to compute the specific volume of the sulfur hexafluoride in the two limiting cases where the gas spring is fully extended and fully compressed.

TABLE V

| | Gas Spring Fully Extended | Gas Spring Fully Compressed |
|---|---|---|
| Volume Vv [Eq. (14)] | 42.47 cu. in. | 45.02 cu. in. |
| Mass M of $SF_6$ | 0.4644 lb. | 0.4644 lb. |
| Specific Volume = Vv/Mass | 91.45 cu. in. per lb. | 96.95 cu. in. per lb. |

The operating region corresponding to 0.4644 lb. of sulfur hexafluoride is shown by the dotted line curve "K" in FIG. 6. The range of specific volume is quite narrow in this example. Furthermore, these specific volumes extend to temperatures above the critical point where it is impossible for the sulfur hexafluoride to exist in a liquid state. This example is designed such as to limit the specific volume from changing substantially from the extended to the compressed configuration. This limitation is accomplished by locating the baffle 32 closer to end wall 16 than in Example 2. Note the difference in Lv in Examples 2 and 3. This feature has the effect of making the pressure of the sulfur hexafluoride depend almost entirely on the temperature and very little on the displacement parameter X. It is important to note that even above 40° C., where the operating region leaves the liquid-vapor phase, the properties of sulfur hexafluoride are such that the percent change of its pressure with temperature is greater than that of the primary gas, nitrogen.

Table VI below presents the gas spring force over the full range of spring compression and temperature for which the gas spring of Example 3 is designed. The force values come from equation 16 above, together with equation 15 and the sulfur hexafluoride vapor pressure values from the phase diagram of FIG. 6.

TABLE VI

| Gas Spring Length, Lt [in.] | Compression X [in.] | Spring Force at Various Temperatures [°C.] | | | | | | | | | | | |
|---|---|---|---|---|---|---|---|---|---|---|---|---|---|
| | | −30 | −20 | −10 | 0 | 10 | 20 | 30 | 40 | 50 | 60 | 70 | 80 |
| 50 | 0.00 | 147 | 150 | 152 | 153 | 152 | 150 | 147 | 145 | 146 | 148 | 149 | 151 |
| 46 | 4.00 | 149 | 152 | 154 | 154 | 154 | 152 | 149 | 147 | 148 | 150 | 152 | 154 |
| 42 | 8.00 | 150 | 154 | 156 | 156 | 156 | 154 | 151 | 149 | 151 | 153 | 155 | 157 |
| 38 | 12.00 | 152 | 155 | 157 | 158 | 158 | 156 | 153 | 152 | 154 | 156 | 158 | 160 |
| 34 | 16.00 | 154 | 157 | 159 | 160 | 160 | 158 | 155 | 154 | 156 | 158 | 160 | 163 |
| 30 | 20.00 | 156 | 159 | 161 | 162 | 162 | 160 | 158 | 157 | 159 | 161 | 163 | 166 |

Figure 7:
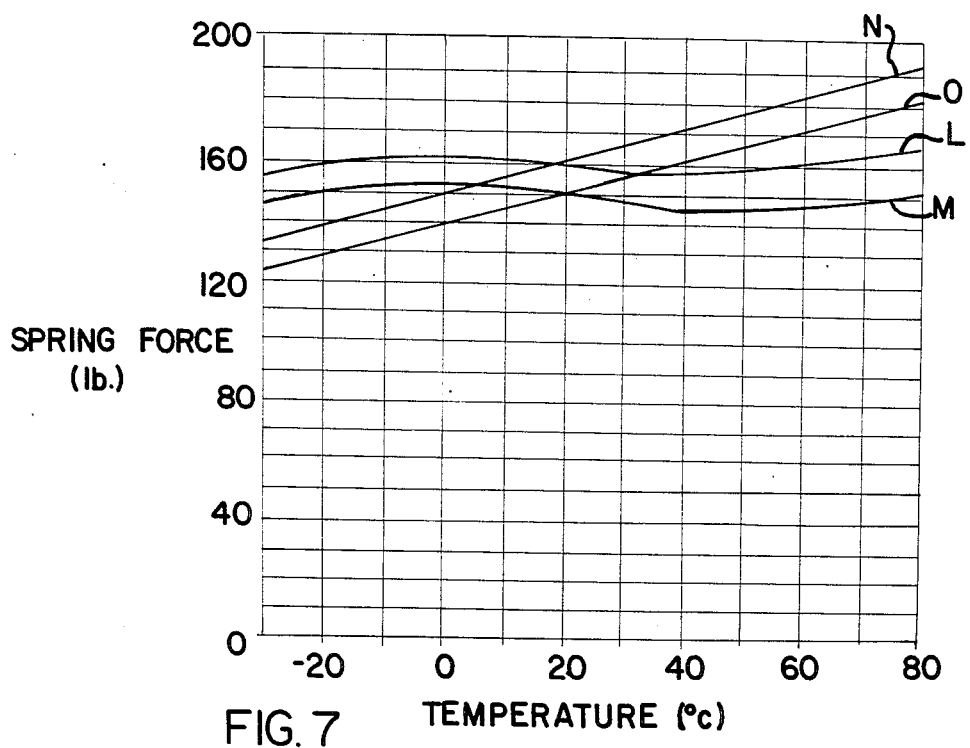
FIG. 7 is a graph of net outward spring force versus temperature of the gas spring shown in FIG. 3 wherein the primary pressure source is nitrogen gas and the secondary pressure source is sulfur hexafluoride.

FIG. 7 is a plot of the results of Table VI for full compression and full extension and compares the results with an uncompensated gas spring. Curve "L" represents the spring force versus temperature for the temperature compensated gas spring of Example 3 wherein the spring is completely compressed. Curve "M" shows the same data where the spring is completely extended. Curves "N" and "O" show the spring force versus temperature for an uncompensated gas spring which is completely compressed and completely extended, respectively.

Both FIG. 7 and Table VI show clearly that there is compensation for changes in temperature, even when operating above the critical point of the secondary pressure source substance for part of the time. As with the FREON-12 example, the degree of temperature compensation for the sulfur hexafluoride example can be quantified by computing the resulting percent variation of the spring force with temperature using the data from Table VI and comparing it with that expected for an uncompensated design. Table VII gives the temperature-compensated results. On a full swing basis, the deviation due to temperature is under 6 percent, a value that is only half as much as for the FREON-12 example and compares even more favorably with the 37.5% deviation of the uncompensated gas spring as discussed above in connection with Example 2.

TABLE VII

| Gas Spring Length, Lt [in.] | Compression X [in.] | Design Force [lb.] @ T = 20° C. F (X, 20) | Minimum Force Fmin [lb.] | Maximum Force Fmax [lb.] | Percent Variation = $\frac{Fmax - Fmin}{F(X, 20)} \times 100$ |
|---|---|---|---|---|---|
| 50 | 0.00 | 150 | 145 | 153 | 5% |
| 46 | 4.00 | 152 | 147 | 154 | 5% |
| 42 | 8.00 | 154 | 149 | 157 | 5% |
| 38 | 12.00 | 156 | 152 | 160 | 5% |
| 34 | 16.00 | 158 | 154 | 163 | 6% |
| 30 | 20.00 | 160 | 156 | 166 | 6% |

Having described preferred embodiments of the invention, it is to be understood that it may be otherwise embodied within the scope of the appended claims.

I claim:

1. A temperature-compensated gas spring, comprising:

a self-contained casing having a closed end wall and an apertured end wall;

a piston rod extending from the interior to the exterior of said casing through said apertured end wall in sealed relation thereto;

a piston mounted on the piston rod within the casing and dividing the interior of said casing into first and second sealed chambers adjacent said closed end wall and said apertured end wall, respectively, of said casing;

a primary pressure source in said first chamber creating a primary pressure acting against the piston to urge the piston rod out of the casing;

a secondary pressure source in said second chamber creating a secondary pressure acting against the piston to urge the piston rod into the casing;

the magnitudes of said primary and secondary pressures relative to the respective piston areas on which they act being such that a new outward force is exerted on the piston rod;

the primary pressure source comprising a pressurized gas characterized by (1) a first percent change of pressure with temperature and (2) a change of pressure with volume such that said net outward force varies with piston rod displacement;

the secondary pressure source comprising a two-phase vapor-liquid system having a vapor pressure characterized by a second percent change in pressure with temperature at temperatures below the critical temperature of said system;

the second percent change of pressure with temperature being greater than the first percent change of pressure with temperature; and the volume of said second chamber and the mass of said two-phase system in said second chamber being such that (1) the two-phase system does not fully condense into liquid at any point over the operating temperature range of the gas spring and at any point over the working stroke of the piston rod and (2) the liquid phase and the vapor phase of said two-phase system remain in equilibrium over at least a substantial portion of the temperature range over which temperature compensation is to be effected and over at least a portion of the working stroke of the piston rod, whereby the effect of temperature on the net outward force exerted on the piston rod is compensated for over part or all of the working stroke of the piston rod.

2. The gas spring of claim 1 wherein said primary pressure varies essentially proportionally with absolute temperature.

3. The gas spring of claim 2 wherein said secondary pressure varies approximately exponentially with absolute temperature.

4. The gas spring of claim 1 wherein said pressurized gas remains in the gas phase over the full operating temperature range of the gas spring.

5. The gas spring of claim 4 wherein said temperature range is −30° C. to 80° C.

6. The gas spring of claim 4 wherein said pressurized primary gas is nitrogen.

7. The gas spring of claim 1 wherein the liquid and vapor phases of the two-phase system remain in equilibrium over the full operating temperature range of the gas spring.

8. The gas spring of claim 7 wherein the two-phase system is selected from the group consisting of acetylene, ethane, FREON-12, FREON-13, FREON-114, propane, propadiene, perfluoropropane, dimethyl ether, N-butane, ammonia, hydrogen bromide and hydrogen iodide.

9. The gas spring of claim 7 wherein the two-phase system is ammonia.

10. The gas spring of claim 7 wherein the two-phase system is FREON-12.

11. The gas spring of claim 7 wherein the operating temperature range is −30° C. to 80° C.

12. The gas spring of claim 1 wherein the two-phase system is sulfur hexafluoride.

13. The gas spring of claim 1 wherein said primary pressure source is pressurized nitrogen gas, and said secondary pressure source is the vapor pressure of a two-phase system selected from the group consisting of ammonia, FREON-12, and sulfur hexafluoride.

14. The gas spring of claim 1 wherein said pressurized gas remains in the gas phase over the full working stroke of the piston rod.

15. The gas spring of claim 1 wherein the liquid and vapor phases of the two-phase system remain in equilibrium over the full working stroke of the piston rod.

16. A temperature-compensated gas spring, comprising:
(a) a self-contained casing including an outer tube having a closed end wall at one end and a wall having an opening therethrough at the other end;
(b) an inner tube disposed within the outer tube and having one end attached to said closed end wall;
(c) a slidable piston disposed within said inner tube in sealed relation thereto and dividing said inner tube into a first inner volume between the piston and said closed end wall and a second inner volume in the remainder of the inner tube;
(d) a rod secured to the piston and extending through the opening in said other end wall in sealed relation thereto;
(e) means between said inner tube and said outer tube for dividing the casing volume exterior of said inner tube in a gas-tight manner into a first outer volume adjacent said closed end wall and a second outer volume adjacent said wall having an opening therethrough;
(f) first conduit means connecting said first inner volume and said first outer volume;
(g) second conduit means connecting said second inner volume and said second outer volume;
(h) a primary pressure source in said first inner and outer volumes creating a primary pressure acting against said piston to urge said rod out of said casing, said primary pressure source comprising a pressurized gas characterized by (1) a first percent change of pressure with temperature and (2) a change of pressure with volume such that the magnitude of said primary pressure source varies with piston rod displacement;
(i) a secondary pressure source in said second inner and outer volumes creating a secondary pressure acting against said piston to urge said rod into said casing, said secondary pressure source comprising a two-phase vapor-liquid system characterized by a second percent change of pressure with temperature at temperatures below the critical temperature of said system;
(j) the magnitudes of said primary and secondary pressure sources relative to the respective piston areas on which they act being such that a net outward force is exerted on the piston rod which varies with piston rod displacement;
(k) the second percent change of pressure with temperature being greater than the first percent change of pressure with temperature; and
(l) the total volume of said secnd inner and outer volumes and the mass of said two-phase system in said second inner and outer volumes being such that (1) the two-phase system does not fully condense into liquid at any point over the operating temperature range of the gas spring and at any point of the working stroke of the piston rod and (2) the liquid phase and the vapor phase of said two-phase system remain in equilibrium over at least a substantial portion of the temperature range over which temperature compensation is to be effected and over at least a portion of the working stroke of the piston rod, whereby the effect of temperature on the net outward force exerted on the piston rod is compensated for over part or all of the working stroke of the piston rod.

17. The gas spring of claim 16 wherein said first conduit means comprises at least one hole through said inner tube beyond the extent of travel of said piston toward said closed end wall, wherein said inner tube extends toward but stops short of said wall having an opening therethrough, and wherein said inner tube is open between said second inner volume and second outer volume to form second connecting means.

18. The gas spring of claims 17 including a stop which limits the travel of said piston away from said closed end wall.

19. The gas spring of claim 18 wherein said first conduit means comprises at least one hole through said inner tube beyond the extent of travel of said piston toward said closed wall, wherein said inner tube extends to and is attached to said wall having an opening therethrough, and wherein said second conduit means comprises at least one hole through said inner tube beyond the extent of travel of said piston away from said closed end wall.

20. The gas spring of claims 16, 17, or 19 wherein said primary pressure varies essentially proportionally with absolute temperature.

21. The gas spring of claim 20 wherein said pressurized gas remains in the gas phase over the full operating temperature range of the gas spring.

22. The gas spring of claim 21 wherein said operating temperature range is −30° C. to 80° C.

23. The gas spring of claim 21 wherein said pressurized gas is nitrogen gas.

24. The gas spring of claim 20 wherein said secondary pressure varies approximately exponentially with absolute temperature.

25. The gas spring of claim 16 wherein the liquid and vapor phases of said two-phase system remain in equilibrium over the full operating temperature range of the gas spring.

26. The gas spring of claim 25 wherein said two-phase system is selected from the group consisting of acetylene, ethane, FREON-12, FREON-13, FREON-114, propane, propadiene, perfluoropropane, dimethyl ether, N-butane, ammonia, hydrogen bromide, and hydrogen iodide.

27. The gas spring of claim 25 wherein said two-phase system is ammonia.

28. The gas spring of claim 25 wherein said two-phase system is FREON-12.

29. The gas spring of claim 16 wherein said two-phase system is sulfur hexafluoride.

30. The gas spring of claims 16, 17, or 19 wherein said primary pressure source is pressurized nitrogen gas, and said secondary pressure source is the vapor pressure of a two-phase system selected from the group consisting of ammonia, FREON-12, and sulfur hexafluoride.

31. The gas spring of claims 16, 17, or 19 wherein said inner tube, said outer tube, and said piston are cylindrical in cross section.

* * * * *